United States Patent
Kai et al.

(10) Patent No.: US 9,305,708 B2
(45) Date of Patent: Apr. 5, 2016

(54) MULTILAYER CERAMIC ELECTRONIC DEVICE

(71) Applicant: TDK Corporation, Tokyo (JP)

(72) Inventors: Nobutaka Kai, Tokyo (JP); Yasuhiro Okui, Tokyo (JP); Satoru Kindaichi, Nikaho (JP); Hideki Kaneko, Tokyo (JP); Tatsuya Kojima, Tokyo (JP); Akitoshi Yoshii, Tokyo (JP)

(73) Assignee: TDK CORPORATION, Tokyo (JP)

( * ) Notice: Subject to any disclaimer, the term of this patent is extended or adjusted under 35 U.S.C. 154(b) by 107 days.

(21) Appl. No.: 14/445,894

(22) Filed: Jul. 29, 2014

(65) Prior Publication Data

US 2015/0036262 A1    Feb. 5, 2015

(30) Foreign Application Priority Data

Jul. 30, 2013 (JP) .................................. 2013-158192
Jul. 28, 2014 (JP) .................................. 2014-153156

(51) Int. Cl.
*H01G 4/12* (2006.01)
*H01G 4/30* (2006.01)

(52) U.S. Cl.
CPC ........... *H01G 4/1209* (2013.01); *H01G 4/1218* (2013.01); *H01G 4/1236* (2013.01); *H01G 4/30* (2013.01)

(58) Field of Classification Search
None
See application file for complete search history.

(56) References Cited

U.S. PATENT DOCUMENTS

| | | | |
|---|---|---|---|
| 2006/0023399 A1* | 2/2006 | Fujioka | B32B 18/00 361/321.2 |
| 2008/0112109 A1* | 5/2008 | Muto | C04B 35/4682 361/301.4 |
| 2014/0009864 A1* | 1/2014 | Takashima | C04B 35/5682 361/301.4 |
| 2014/0009868 A1* | 1/2014 | Yamaguchi | C04B 35/4682 361/321.4 |
| 2015/0299048 A1* | 10/2015 | Yoon | C04B 35/4682 361/301.4 |

FOREIGN PATENT DOCUMENTS

| | | |
|---|---|---|
| JP | 11-45617 A | 2/1999 |
| JP | 2002-265260 A | 9/2002 |
| JP | 2002-270458 A | 9/2002 |

* cited by examiner

*Primary Examiner* — Dion R Ferguson
(74) *Attorney, Agent, or Firm* — Arent Fox LLP

(57) ABSTRACT

A multilayer ceramic electronic device comprising a lamination in which an internal electrode layer 3 and a dielectric layer 2 are laminated alternatively, wherein the dielectric layer 2 is comprised of a dielectric ceramic composition including a main component represented by a general formula of $ABO_3$ and a rare-earth component R, and segregation phases 5 including the rare-earth component R are present in the dielectric layer 2. When the dielectric layer 2 is separated to six areas by dividing the dielectric layer 2 sandwiched by a pair of the internal dielectric layers 3 in the thickness direction, there are the R segregation phases present in two neighboring areas 2a respectively adjacent to the pair of the internal electrode layers 3 in the dielectric layer 3 at a ratio of double or more compared with the R segregation phases present in two central areas 2b located at a substantially center in the dielectric layer 2.

5 Claims, 5 Drawing Sheets

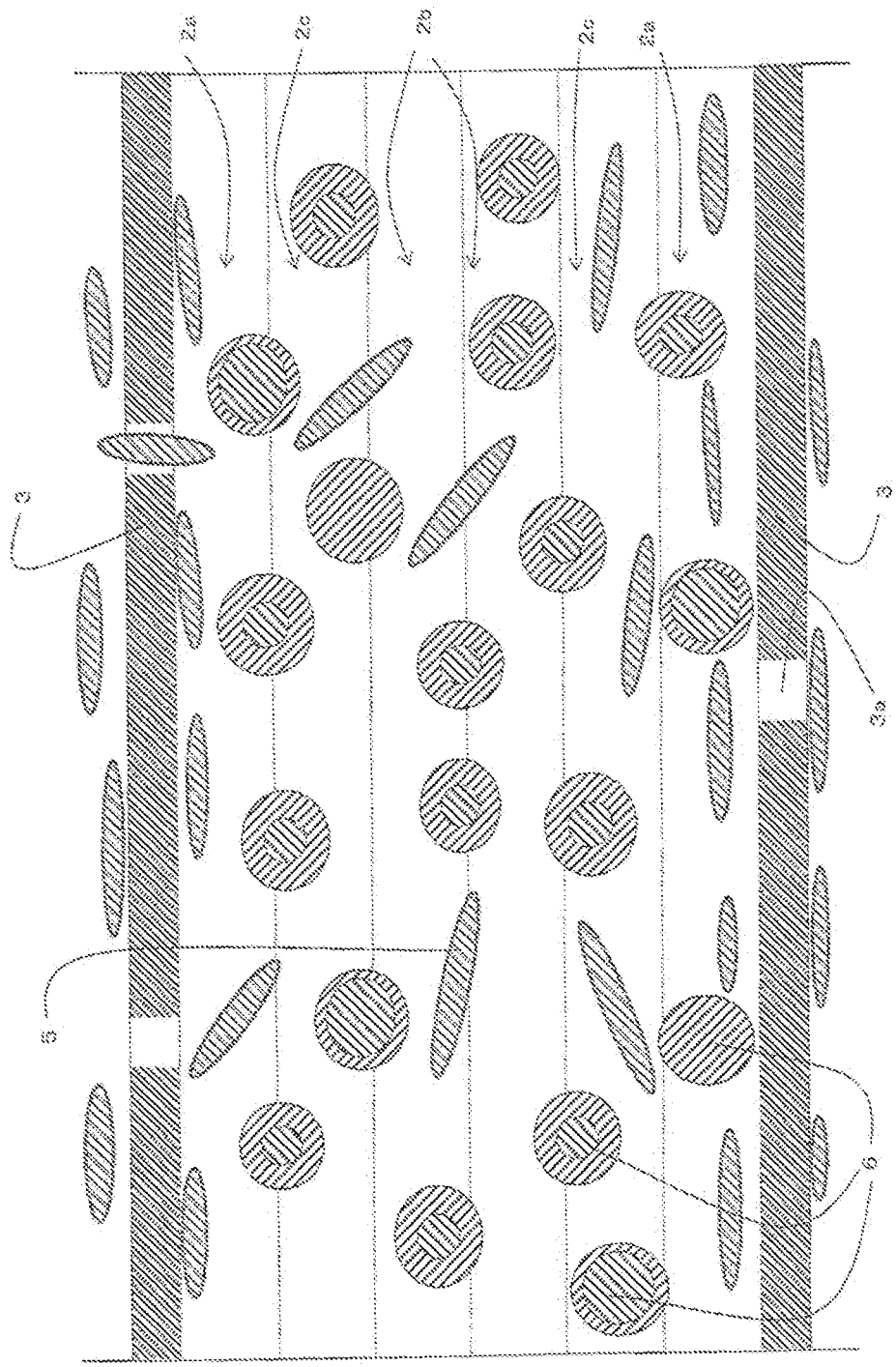

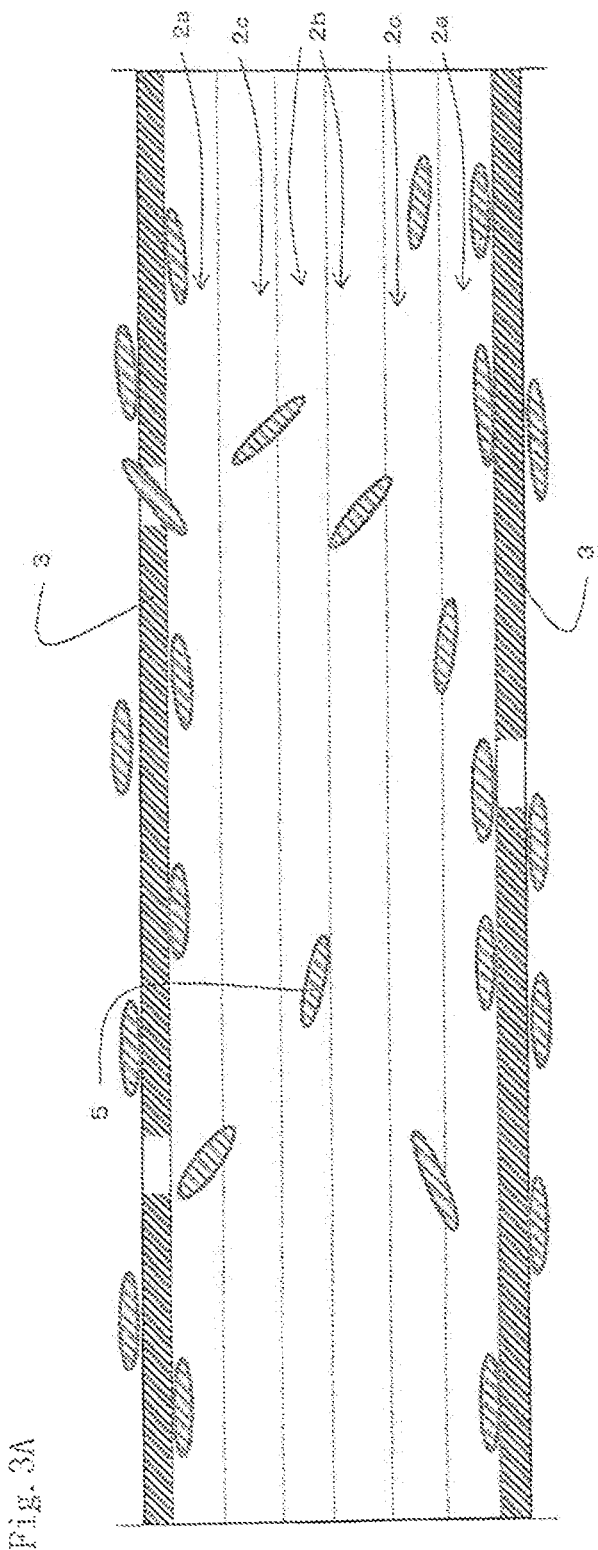

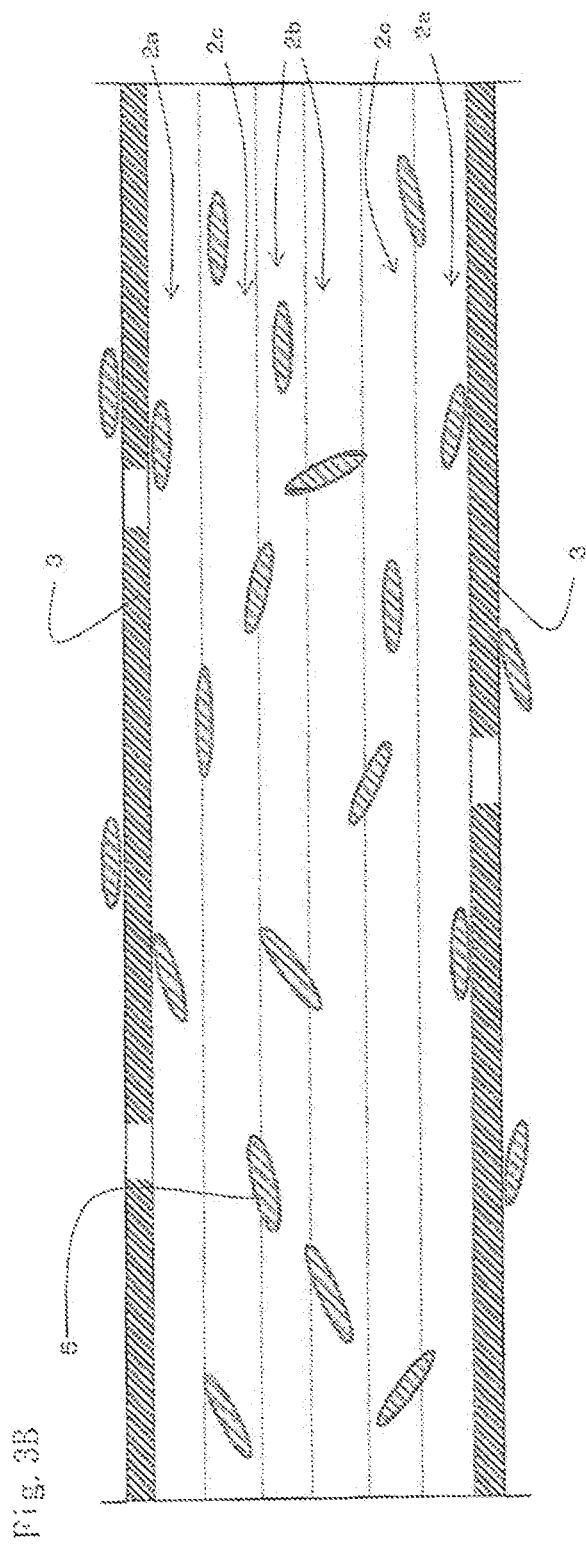

MULTILAYER CERAMIC ELECTRONIC DEVICE

BACKGROUND OF THE INVENTION

1. Field of the Invention

The present invention relates to a multilayer ceramic electronic device such as a multilayer ceramic capacitor which electrode layers and dielectric layers are laminated alternatively.

2. Description of the Related Art

In recent years, in accordance with downsizing and high densification of electronic devices, downsizing, larger capacity and improvement in reliability of the multilayer ceramic electronic device such as a multilayer ceramic capacitor are required. Thus, the fact of increase of lamination number of the dielectric layers and thinning of the dielectric layers itself regarding the multilayer ceramic electronic device, and the fact of improvement in reliability of the multilayer ceramic electronic device are being achieved.

Cited Document 1 describes a dielectric porcelain and a multilayer electronic device whose reliability in a high temperature load test can be improved by including a crystal layer of $\gamma$-$Y_2Si_2O_7$ in a grain boundary phase of the dielectric layers even if they are thinned. Further, Cited Document 1 discloses that the specific permittivity and the dielectric loss of the dielectric porcelain can be enhanced.

However, in the conventional multilayer ceramic electronic device shown in Patent Document 1, the temperature and the voltage in the high temperature load test are 85° C. and 9.5 V. Therefore, the conventional multilayer ceramic electronic device shown in Patent Document 1 still has a problem in highly accelerated lifetime at higher temperature and higher voltage, and higher insulation resistance is further required.

[Patent Document 1] Japanese Unexamined Patent Publication No. 2002-265260

SUMMARY OF THE INVENTION

The present invention is accomplished in view of such situation, and the object is to provide the multilayer ceramic electronic device whose highly accelerated lifetime and insulation resistance are further improved.

In order to achieve the above mentioned object, the multilayer ceramic electronic device according to the present invention comprises;

a lamination in which an internal electrode layer and a dielectric layer are laminated alternatively, wherein the dielectric layer is comprised of a dielectric ceramic composition including a main component represented by a general formula of $ABO_3$ (A is at least one selected from Ba, Sr and Ca, and B is at least one selected from Ti, Zr and Hf) and a rare-earth component R (R is at least one selected from Sc, Y, La, Ce, Pr, Nd, Pm, Sm, Eu, Gd, Tb, Dy, Ho, Er, Tm, Yb and Lu), R segregation phases including the rare-earth component R are present in the dielectric layer, and when the dielectric layer is separated to six areas by dividing the dielectric layer sandwiched by a pair of the internal dielectric layers in the thickness direction, there are the R segregation phases present in two neighboring areas respectively adjacent to the pair of the internal electrode layers in the dielectric layer at a ratio of double or more compared with the R segregation phases present in two central areas located at a substantially center in the dielectric layer.

The segregation phases including the rare-earth component R is present in the dielectric layer of the multilayer ceramic electronic device according to the present invention, and the segregation phases including R is unevenly distributed near the internal electrode layer of the dielectric layer. Thus, highly accelerated lifetime and insulation resistance can be improved without deteriorating dielectric loss $\delta$ and specific permittivity $\in$.

Preferably, the dielectric layer additionally comprises a sub-component including Si, at least a part of a Si segregation phase including Si is coexistently present at the R segregation phases in the dielectric layer, and a Si.R copresence ratio showing a ratio of an area of a copresence region where the R segregation phases and the Si segregation phase are copresent is 35% or more with respect to an area of a region where the R segregation phases and/or the Si segregation phase are present.

The function and effect of the present invention further improve because the Si.R copresence ratio is 35% or more.

Preferably, a dielectric particle in which the rare-earth component R is at least dissolved in solid on a surface of the main component of $ABO_3$ is present in the dielectric layer.

More preferably, the dielectric particle in which the rare-earth component R is dissolved in solid from a particle surface of the main component of $ABO_3$ in a range of 15% or more along a grain diameter is present in the dielectric layer and a ratio of the dielectric particle dissolved in solid in the range of 15% or more is 70% or more with respect to the whole number of the dielectric particles in a predetermined observation visual field.

The function and effect of the present invention further improve because a ratio of the dielectric particle dissolved 15% or more in solid is high.

Preferably, there is a discontinuous part in the internal dielectric layer and the R segregation phases including the rare-earth component R are present at the discontinuous part.

BRIEF DESCRIPTION OF THE DRAWINGS

FIG. 2 is a schematic cross section in which details of the dielectric layer according to one embodiment of the present invention are enlarged.

FIG. 3A is a cross section of the dielectric layer showing a state where the segregation phases according to one embodiment of the present invention are unevenly distributed in the neighboring areas of the internal electrodes in the dielectric layer.

FIG. 3B is a cross section of the dielectric layer showing a state where the segregation phases are almost uniformly present in the dielectric layers with respect to FIG. 3A.

DESCRIPTION OF THE PREFERRED EMBODIMENTS

Figure 1:
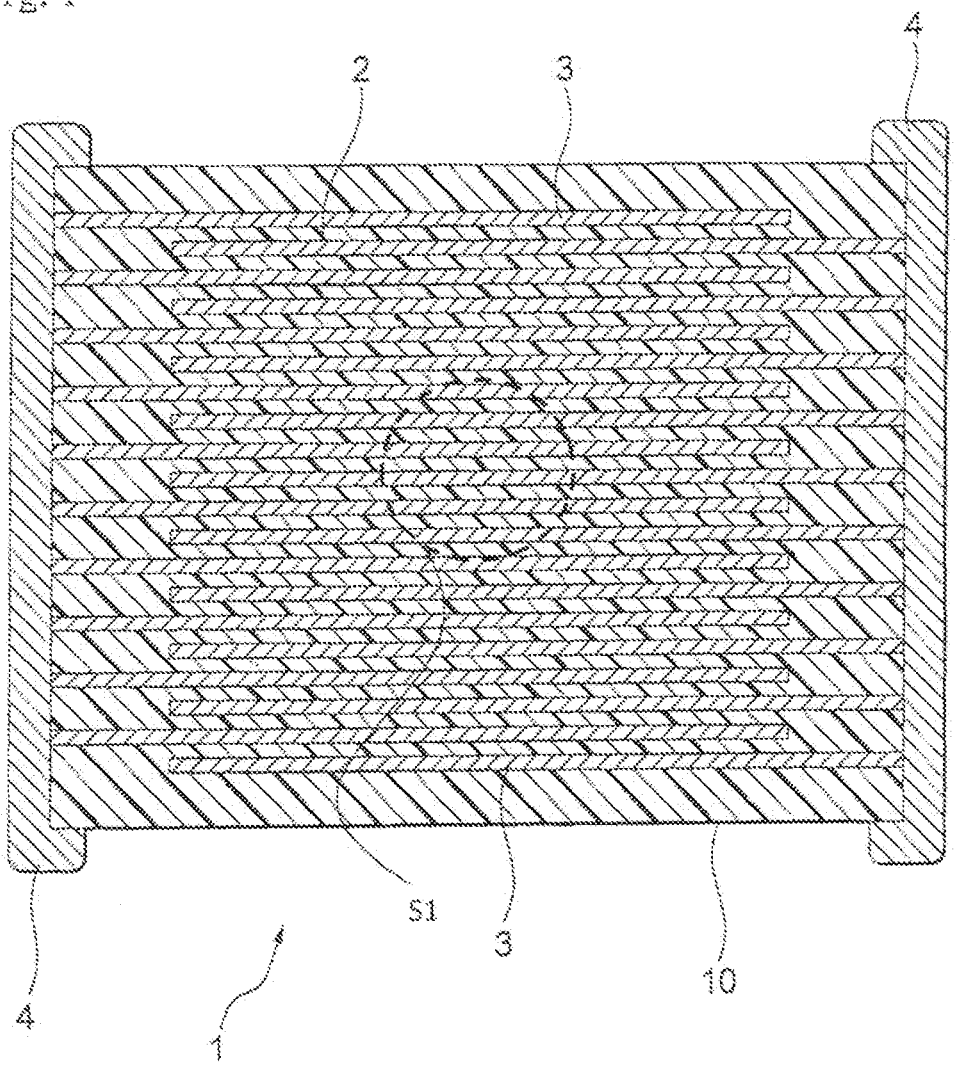
FIG. 1 is a cross section of the multilayer ceramic capacitor according to one embodiment of the present invention.

Hereinafter, the present invention will be described based on the embodiments shown in the drawings.

<Multilayer Ceramic Capacitor 1>

As shown in FIG. 1, a multilayer ceramic capacitor 1 according to one embodiment of the present invention comprises a capacitor element body 10, in which dielectric layers 2 and internal electrode layers 3 are laminated alternately. A pair of external electrodes 4, which are respectively conductive to the internal electrode layers 3 placed inside of the element body 10 alternately, are formed at the ends of the element body 10. A shape of the element body 10 is not particularly limited, but it is usually a rectangular parallelepiped shape. Also, a size thereof is not particularly limited, either, and it is properly selected based on the use.

<Dielectric Layers 2>

The dielectric layers 2 are comprised of dielectric ceramic composition. The dielectric ceramic composition contains a main component consisted of a compound represented by a general formula of $ABO_3$ (A is at least one selected from a group of Ba, Ca and Sr, and B is at least one selected from a group of Ti, Zr and Hf) as the main component and having a tetragonal perovskite crystal structure. Further, as a sub-component, the dielectric ceramic composition contains an oxide of a rare-earth component R (R is at least one selected from Sc, Y, La, Ce, Pr, Nd, Pm, Sm, Eu, Gd, Tb, Dy, Ho, Er, Tm, Yb and Lu), and if necessary, an oxide having Si. Note that, an amount of oxygen (O) may be biased slightly from a stoichiometry composition of the above formula.

In the present embodiment, a compound comprising the main component is preferably represented by a composition formula of $(Ba_{1-x-y}Ca_xSr_y)TiO_3$. That is, a B-site atom is composed of Ti.

In the present embodiment, the B-site atom is only Ti, but an element except for Ti (e.g., Zr or Hr) may be included by the B-site atom as far as it is almost the same as impurity quantity. In this case, it can be regarded as impurity quantity when the amount of the atom except for Ti is 0.3 atom % or less with respect to the B-site atom 100 atom %.

Also, a mole ratio of A-site atom (Ba, Sr and Ca) to B-site atom (Ti) is represented by A/B ratio and it is preferably 0.98 to 1.02 in the present embodiment. Note that, both x and y are in an optional range, but they are preferably in the following range.

In the present embodiment, x in the above formula is preferably $0 \leq x \leq 0.5$. x represents Ca atomic number, and capacity temperature coefficient and specific permittivity can be controlled by setting x in the above range. In the present embodiment, Ca is not necessarily included.

In the present embodiment, y in the above formula is preferably $0 \leq y \leq 0.5$. y represents Sr atomic number, and specific permittivity at room temperature can be improved by setting y in the above range. In the present embodiment, Sr is not necessarily included.

In the present embodiment, an oxide of R is necessarily included in the dielectric layers as a sub-component. An amount of the oxide of R is determined based on a desired property, but it is preferably 0.03 to 1.5 mol in terms of $R_2O_3$ with respect to $ABO_3$ 100 mol. The element of R is at least one selected from a group of Sc, Y, La, Ce, Pr, Nd, Pm, Sm, Eu, Gd, Tb, Dy, Ho, Er, Tm, Yb and Lu. The element of R is at least one preferably selected from a group of Y, Dy, Gd and Ho, and Y is particularly preferable.

In the present embodiment, an oxide having Si as a sub-component is preferably included in the dielectric layers. An amount of the oxide of Si is determined based on a desired property, but it is preferably 0.01 to 0.10 mol or, more preferably, 0.01 to 0.05 mol in terms of $SiO_2$ with respect to $ABO_3$ 100 mol. Note that, in the present embodiment, Si oxide may singly be an oxide having Si, but a composite oxide of Si and other metal element (such as alkali metal or alkali-earth metal) or so may also be the oxide having Si.

In the present embodiment, the above dielectric ceramic composition may additionally include other sub-component based on a desired property.

For example, the dielectric ceramic composition according to the present embodiment may include an oxide of at least one element selected from Mn, Mg and Cr. An amount of the oxide is preferably 0.02 to 0.30 mol in terms of each oxide with respect to $ABO_3$ 100 mol.

Also, the dielectric ceramic composition according to the present embodiment may include an oxide of at least one selected from V, Ta, Nb, Mo and W. An amount of the oxide is preferably 0.02 to 0.30 mol in terms of each oxide with respect to $ABO_3$ 100 mol.

A thickness of the dielectric layers 2 is not particularly limited and is properly determined based on a desired property or the use and the like, but is preferably 2.0 to 10 μm or, more preferably, 2.8 to 4.0 μm or so. Also, the lamination number of the dielectric layers 2 is not particularly limited, but is preferably 20 or more. The lamination number is more preferably 50 or more, and 100 or more is particularly preferable.

<Segregation Phases 5>

FIG. 2 is an enlarged schematic diagram of a section at the center Si of the section of the multilayer ceramic capacitor 1 shown in FIG. 1. In the present embodiment, the presence of segregation phases at the section of the center Si or so was observed. However, the observed part is not limited to the center of the multilayer ceramic capacitor, and it may also be where the internal electrode layers 3 begin to overlap or may also be lead parts of the internal electrode layers 3.

As shown in FIG. 2, the segregation phases 5 are present in the dielectric layers 2. The segregation phases 5 include R and/or Si as a main component. Particularly, at least, the segregation phases 5 having R are necessarily present in the dielectric layers 2 of the present embodiment. The segregation phases 5 having R may additionally include Si. Also, the segregation phases 5 whose main component is Si may be present.

The presence of the segregation phases 5 can be confirmed by the difference in contrast of a secondary electronic image or reflected image of a scanning electron microscope (SEM) by comparing with electrodes or dielectric, for example. Whether different contrasts are present or not may be judged visually or by software etc. which performs image processing. Also, the fact that the main component of the segregation phases 5 is R and/or Si can be confirmed by using an Electron Probe Micro-Analyser (EPMA), for example. Also, to easily confirm the fact, an Energy Dispersive Spectroscopy (EDS) can be used as well. In the present embodiment, the main component of the segregation phases 5 is R and/or Si and the segregation phases 5 may include other minute quantities, but they are 15 mol % or less with respect to the whole segregation phases 5.

In the present embodiment, as shown in FIG. 2 and FIG. 3A, there are many segregation phases 5 having R around the internal electrode layers. Specifically, as shown in FIG. 2 and FIG. 3A, when the section of the dielectric layers 2 is separated to neighboring areas 2a, connecting areas 2c and central areas 2b by equally dividing the section into six in the thickness direction, there are the segregation phases 5, which have R and are present in the two neighboring areas 2a, at a segregation ratio of double or more with respect to the segregation phases 5, which have R and are present in the two central areas 2b.

On the other hand, as shown in FIG. 3B, the following conventional example may also be considered: The segregation phases 5 having R are almost uniformly present in the dielectric layers 2 and the segregation phases 5, which have R and are present in the neighboring areas 2a, have a segregation ratio of less than double with respect to the segregation phases 5, which have R and are present in the central areas 2b. In the present embodiment, the segregation ratio of segregation phases 5, which have R and are present in the neighboring areas 2a, is in the desired range of double or more with respect to the segregation phases 5, which have R and are present in the central areas 2b. From this, highly accelerated lifetime and insulation resistance can be enhanced without deteriorating dielectric loss δ and permittivity ∈ (or temperature characteristics).

Note that, in the present embodiment, the presence ratio of the segregation phases 5, which have R and are present in the connecting areas 2c, is not particularly limited, but it is preferably lower than that of the neighboring areas 2a and higher than that of the central areas 2b.

In the present embodiment, the segregation phases 5 having Si are preferably present in the dielectric layers 2 together with the segregation phases 5 having R. Specifically, a Si.R copresence ratio showing a ratio of an area where both R and Si are segregated is preferably 35% or more with respect to an area where R and/or Si are/is segregated.

The Si.R copresence ratio is calculated by the following method. First, images of R and Si to be analyzed are obtained by making the section of the dielectric layers 2 undergo STEM-EDS mapping analysis. Each of pixels of the images to be analyzed are divided into 0 to 90 based on a contrast intensity. Specifically, a pixel whose contrast intensity is smallest (no detection) is 0 and a pixel whose contrast intensity is highest is 90. A pixel whose contrast intensity is less than 15 is regarded as a region with no element, a pixel whose contrast intensity is from 15 to less than 75 is regarded as a region with solid solution, and a pixel whose contrast intensity is 75 or more is regarded as a region with segregation. An image which a region with segregation is extracted from the images of R and Si to be analyzed is created with respect to R and Si, respectively. When the image which the region with segregation of R is extracted and the image which the region with segregation of Si is extracted are overlapped, a ratio of a part where both R and Si are segregated is Si.R copresence ratio with respect to a part where R and/or Si are/is segregated.

<Dielectric Particles 6>

Figure 4:
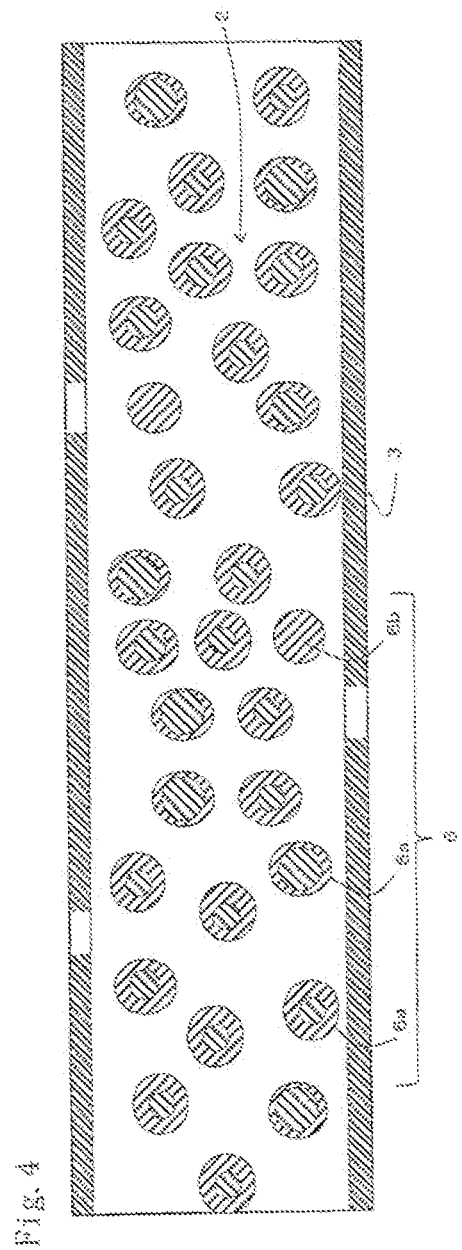
FIG. 4 is a cross section of the dielectric layer showing a state where dielectric particles which rare-earth elements are dissolved in solid are present in the dielectric layer.

In the present embodiment, dielectric particles 6 may be main component particles ($ABO_3$ particles) singly or particles in which R is dissolved in solid (dispersion) with respect to the main component particles ($ABO_3$ particles). Note that, as shown in FIG. 2 and FIG. 4, most of the dielectric particles 6 regarding the present embodiment are core-shell particles 6a. Although the dielectric particles 6 also include all-solid-solution particles 6b, dielectric particles of the single main component particles ($ABO_3$ particles) are hardly included.

Figure 5:
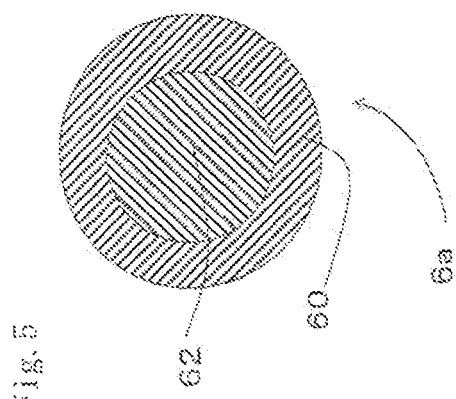
FIG. 5 is an enlarged cross section of the dielectric particles which the rare-earth elements shown in FIG. 4 are dissolved in solid.

As shown in FIG. 5, the core-shell particles 6a comprise a core-shell structure provided with a shell 60 showing a region where at least R is dispersed to the main component and a core 62 substantially consisted of only the main component. There are many kinds of the core-shell particles 6a whose thickness of the shell 60 is large and small. Also, the all-solid-solution particles 6b are dielectric particles at least in which R is dissolved in solid (dispersed) to the center with respect to the main component particles ($ABO_3$ particles).

In the present embodiment, for example, in the range of observation visual field of 5.0×10.0 μm, a ratio of the number of certain dielectric particles 6 whose thickness of the shell 60 is large is preferably 70% or more and, more preferably, 85% or more with respect to the total number of the dielectric particles. The certain dielectric particles 6 whose thickness of the shell 60 is large are the core-shell particles 6a whose thickness of the shell 60 showing a region where at least R is dispersed in the main component occupies 15% or more of a particle diameter of the dielectric particles 6, and the all-solid-solution particles 6b are also included.

In the present embodiment, the above ratio is obtained by calculating the numbers of the dielectric particles and the dielectric particles in which R is dissolved in solid for 15% or more of the particle diameter in the range of the observation visual field. The numbers of the dielectric particles in which R is dissolved in solid and the dielectric particles dissolved in solid for 15% or more can be counted visually by mapping images obtained by making the section of the dielectric layers undergo STEM-EDS mapping analysis.

Note that, in FIG. 2 and FIG. 4, the dielectric particles 6 in the dielectric layers 2 are drawn sparsely, but in reality, the dielectric particles 6 are placed more densely. Grain boundaries (not shown in drawings) are formed therebetween and there are the segregation phases 5 apart from the dielectric particles 6.

A crystal grain diameter of the dielectric particles 6 is determined based on a thickness of the dielectric layers 2 or so. Note that, the crystal grain diameter of the dielectric particles 6 is not particularly limited, but it is preferably about 0.2 to 1 μm. The crystal grain diameter of the dielectric particles 6 is measured by a usually used method. For example, the crystal grain diameter is equal to a value obtained by cutting the element body 10 in the lamination direction of the dielectric layers 2 and the internal electrode layers 3, measuring an average area of the dielectric particles on the section, calculating a diameter as a circle equivalent diameter, and multiplying it by 1.27 times. Then, an average crystal particle diameter (unit: μm) is equal to a value in which a cumulation is 50% seen from cumulative frequency distribution of the crystal particle diameter obtained by measuring in 200 or more of the dielectric particles.

<Internal Electrode Layers 3>

In the present embodiment, a conductive material contained in the internal electrode layers 3 is not particularly limited, but it is preferably Ni or a Ni alloy. As the Ni alloy, it is preferably an alloy of Ni and one or more elements selected from Mn, Cr, Co and Al, and the content of Ni in the alloy is preferably 95 weight % or more. Note that, various minute quantities such as P may be contained about 0.1 weight % or less in Ni or the Ni alloy. A thickness of the internal electrode layers 3 can be properly determined based on the use or so.

As shown in FIG. 2, when the internal electrode layers 3 are enlarged, there may be parts (discontinuous parts 3a) where the internal electrodes should be formed but not. The discontinuous parts 3a are formed by spheroidization of conductive particles (mainly Ni particles) due to grain growth during firing, for example. Because of the spheroidization, the distance between adjacent conductive particles is made wide and the conductive material disappears.

In the section shown in FIG. 2, the internal electrode layers 3 seemingly look discontinuous due to the discontinuous parts 3a, but the discontinuous parts 3a are dotted on the main face of the internal electrode layers 3. Therefore, even if the internal electrode layers 3 are discontinuous in the section shown in FIG. 2, other sections are continuous and conduction of the internal electrode layers 3 is ensured. The discontinuous parts 3a are usually formed in the internal electrode layers 3 at a ratio of 3 to 35% with respect to an ideal length (e.g., a length of the internal electrode layers 3 before firing).

In the present embodiment, the segregation phases 5 located at the discontinuous parts 3a are preferably present because a mechanical strength of the multilayer ceramic capacitor 1 is further enhanced by having the segregation phases 5 located at the discontinuous parts 3a.

<External Electrodes 4>

A conductive material contained in the external electrodes 4 is not particularly limited, but cheap Ni, Cu or an alloy of them can be used in the present invention. A thickness of the external electrodes 4 is properly determined based on the use or so.

<Method for Producing Multilayer Ceramic Capacitor 1>

As with a conventional multilayer ceramic capacitor, the multilayer ceramic capacitor 1 of the present embodiment is produced by producing a green chip by ordinary printing or sheet method using paste, firing the green chip and thereafter firing external electrodes with print or transfer. Hereinafter, the producing method will be specifically described.

First, a paste for dielectric layers was prepared by preparing a dielectric material to form the dielectric layers and converting it into a coating material.

First, a material of $ABO_3$, a material of an oxide of R, if necessary, a material of an oxide having Si, and a material of other sub-components are prepared as the dielectric material. As these materials, an oxide of the above components, a mixture thereof, or a composite oxide can be used, but various compounds to be the above oxide or composite oxide by firing can be also used by properly selecting a carbonate, an oxalate, a nitrate, a hydroxide, or an organic metallic compound etc. and mixing them, for example. In the present embodiment, $ABO_3$ of the main component coated with an additive constituent such as R or Si, which is a dielectric material with a coating material, is preferably used.

Note that, as the material of $ABO_3$, a material produced by many different methods such as a so-called solid phase method or various liquid phase methods (e.g., oxalate method, hydrothermal synthesis method, alkoxide method or sol-gel method) can be used.

Further, when other components except for the above main component and the sub-component are contained in the dielectric layers, as with the above, an oxide, a mixture, or a composite oxide of the components can be used as a material of the components. Also, various compounds to be the above oxide or composite oxide after firing can be used.

A content of the various compounds in the dielectric material is determined so that the constitution of the above-mentioned dielectric ceramic composition is obtained after firing. In a condition before making paint, a grain diameter of the dielectric material has generally an average grain diameter of about 0.50 to 0.80 μm.

A paste for the dielectric layers may be an organic type paint kneaded by the dielectric material and organic vehicle, or be an aqueous paint.

An organic vehicle is what a binder is dissolved in an organic solvent. The binder is not particularly limited and it is properly selected from ordinary kinds of binders such as ethylcellulose or polyvinylbutyral. The organic vehicle is not particularly limited, either, and it is properly selected from various organic solvents such as terpineol, butylcarbitol, acetone, or toluene in accordance with a printing method or a sheet method.

Also, when the paste for the dielectric layers is an aqueous paint, an aqueous vehicle which an aqueous binder or a dispersant etc. is dissolved in water and a dielectric material are kneaded. The aqueous paint is not particularly limited and polyvinylalcohol, cellulose or water-soluble acrylic resin etc. is used, for example.

A paste for the internal electrode layers is produced by kneading the organic vehicle and the conductive material consisted of Ni or the Ni alloy, the various oxides to be Ni or the Ni alloy after firing, the organic metallic compound or a resinate and the like. Also, an inhibitor may be included in the paste for the internal electrode layers. The inhibitor is not particularly limited, but it preferably has the same constituent as the main component.

A paste for the exterior electrodes is produced in the same manner as the above paste for the internal electrode layers.

The content of the organic vehicle in the each paste is not particularly limited and an ordinary content such as 1 to 5 weight % of the binder and 10 to 50 weight % of the solvent is adopted, for example. Also, an additive selected from every kind of dispersant, plasticizer, dielectric and insulator etc. as necessary may be contained in each paste. The whole contents are preferably 10 weight % or less.

When the printing method is used, green tips are obtained by printing and laminating the paste for the dielectric layers and the paste for the internal electrode layers from a substrate on the substrate of PET or so, cutting them to desired shapes, and then peeling them from the substrate.

Also, when the sheet method is used, green tips are obtained by framing green sheets with the paste for the dielectric layers, printing the paste for the internal electrodes layers thereon, and then cutting them to desired shapes.

The green chip is debindered before firing. As a condition for the debinding, a temperature raising rate is preferably 5 to 300° C./hour, a holding temperature is preferably 180 to 400° C., and a temperature holding time is preferably 0.5 to 24 hours. Also, the atmosphere during the debinding is air or reducing atmosphere.

The green chip is fired after the debinding. In the firing step of the present embodiment, the temperature raising rate is preferably 200° C./hour or more. The holding temperature during the firing is, depending on the dielectric material constitution, preferably 1250 to 1350° C. Also, the holding time is, depending on the dielectric material constitution, preferably 0.5 to 1.5 hours. By adopting such a firing condition, the segregation phases having rare-earth elements can become easy to be unevenly distributed near the internal electrodes.

The atmosphere during the firing is preferably reducing atmosphere, and a mixed gas of $N_2$ and $H_2$ can be used by humidifying itself as atmosphere gas, for example.

Also, the oxygen partial pressure during the firing is properly determined based on the kind of the conductive material in the paste for the internal electrode layers, but when a base metal such as Ni or Ni alloy is used as the conductive material, the oxygen partial pressure under the atmosphere is preferably $1.0 \times 10^{-8}$ to $1.0 \times 10^{-2}$ Pa. The temperature dropping rate is preferably 50° C./hour or more.

In the present embodiment, the element body after the firing is preferably anneal treated (oxidation treatment of the dielectric layers). Specifically, the holding temperature during the anneal treatment is preferably 950 to 1250° C. or, more preferably, 1060 to 1250° C. and the holding time is preferably 0.1 to 4 hours. Also, the atmosphere during the oxidation treatment is preferably a humidified $N_2$ gas (the oxygen partial pressure: $1.0 \times 10^{-3}$ to 1.0 Pa).

In the above debinding treatment, firing and oxidation treatment, when $N_2$ gas or a mixed gas or so is humidified, wetter can be used, for example. In this case, water temperature is preferably about 5 to 75° C.

The debinding treatment, firing and oxidation treatment can be performed continuously or independently.

By controlling the firing condition and the oxidation treatment condition as the above, the segregation phases having R as the main component become easy to be unevenly distributed in the neighboring areas. In particular, it is important to set the holding temperature during the firing higher than that of normal design so that the segregation phases are unevenly distributed in the neighboring areas.

The exterior electrodes 4 are formed by applying end-face polishing with barrel polishing or sandblast etc. to the capacitor element body obtained as the above and firing it after coating of the paste for of the exterior electrodes, for example. Then, coating layers are formed on a surface of the exterior electrodes 4 by plating or so, if necessary.

The multilayer ceramic capacitor of the present embodiment produced by the above is mounted on a print substrate by soldering or so and used for various electronic devices etc.

Note that, the present invention is not limited to the above-mentioned embodiments, but is variously changeable in the scope of the present invention.

In the above embodiments, by controlling the firing condition, many of the segregation phases having R as the main component are unevenly distributed in the neighboring areas 2a to the internal electrodes. However, the present invention is not limited to this method, and many of the segregation phases having R as the main component can be unevenly distributed in the neighboring areas 2a to the internal electrodes by the following method, for example.

First, each of the dielectric layers is made of multiple-layer structure having sub-layers. The amount of a R-based oxide contained in the dielectric sub-layers adjacent to the internal electrodes is made larger than the amount of a R-based oxide contained in the dielectric sub-layers not adjacent to the internal electrodes. In this case, many segregation phases having R can also be unevenly distributed in the neighboring areas 2a to the internal electrodes.

Also, many segregation phases having R can also be unevenly distributed in the neighboring areas 2a to the internal electrodes by including the R-based oxide in the paste for the internal electrodes. This is because the segregation phases are generated in the neighboring areas of the internal electrodes by the dispersion of the R-based oxide from the internal electrode layers to the dielectric layers in the firing step.

Also, in the above embodiments, the multilayer ceramic capacitor is exemplified as a multilayer ceramic electronic device according to the present invention. However, the multilayer ceramic electronic device according to the present invention is not limited to the multilayer ceramic capacitor and it can be anything as far as it is an electronic device having the above structure.

EXAMPLES

Hereinafter, the present invention will be described based on the more detailed examples, but the present invention is not limited to the examples.

Experimental Example 1

First, $BaTiO_3$ powder was prepared as a material of $ABO_3$ which was a main component. Also, as a material of a sub-component, $Y_2O_3$ powder as a material of rare-earth element R and $(Ba_{0.6}Ca_{0.4})SiO_3$ (hereinafter, also referred as BCG) powder as a sub-component having Si were prepared, respectively.

Next, a dielectric material (barium titanate particles coated with the sub-component) was obtained by wet crushing the above prepared $BaTiO_3$ powder (average particle diameter: 0.5 μm) and the material of the sub-component for 15 hours in a ball mill and drying them. Note that, an addition amount of each sub-component was determined so that BCG was 0.025 mol in terms of Si and Y was 1.0 mol in terms of $Y_2O_3$ with respect to $BaTiO_3$ 100 mol which was the main component in the dielectric ceramic composition after firing.

Then, a paste for the dielectric layers was obtained by mixing and pasting in the ball mill the obtained dielectric material: 100 weight part, polyvinilbutyral resin: 10 weight part, dioctyl phthalate (DOP) as a plasticizer: 5 weight part, and alcohol as a solvent: 100 weight part.

Also, apart from the above, a paste for the internal electrode layers was produced by kneading with three rolls and slurrying Ni powder: 44.6 weight part, terpineol: 52 weight part, ethyl cellulose: 3 weight part, and benzotriazole: 0.4 weight part.

By using the paste for the dielectric layers produced in the above, a green sheet was formed on a PET film. Next, a green sheet having an electrode layer was produced by printing the electrode layer with a desired pattern by using the paste for the internal electrode layers on the green sheet and then peeling the sheet from the PET film. Next, a green chip was obtained by laminating a plurality of the green sheets having electrode layers, adhering them by pressure to make a green lamination, and then cutting the green lamination to a desired size.

Next, the element body as a sintered body was obtained by performing debinding treatment, firing, and oxidation treatment under the following condition against the obtained green chip.

The condition for the debinding treatment was as follows: raising temperature rate; 15° C./hour, holding temperature; 280° C., temperature holding time; 8 hours, and atmosphere; air.

The condition for the firing was as follows: raising temperature rate; 200 to 2000° C./hour, holding temperature; 1280 to 1320° C., holding time; 0.5 to 1.5 hours, temperature dropping rate; 200 to 2000° C./hour, and atmosphere gas; humidified mixed gas of $N_2$ and $H_2$ (oxygen partial pressure: $1.0 \times 10^{-10}$ to $1.0 \times 10^{-7}$ Pa).

The condition for annealing treatment was as follows: raising temperature rate; 250° C./hour, holding temperature; 950 to 1250° C. and preferably 1060 to 1250° C., holding time; 2 hours, temperature dropping rate; 150° C./hour, and atmosphere gas; humidified gas of $N_2$ (oxygen partial pressure: $1.0 \times 10^{-3}$ Pa).

Note that, a wetter was used for humidifying the atmosphere gas during the firing and the oxidation treatment.

Next, samples of the multilayer ceramic capacitor shown in FIG. 1 was obtained by coating Cu as exterior electrodes after polishing the end faces of the obtained element body with sandblast. The size of the capacitor samples was 1.6 mm×0.8 mm×0.8 mm. The thickness of the dielectric layers was 3 μm. The thickness of the internal electrode layers was 1.5 μm. Also, the number of the dielectric layers sandwiched by the internal electric layers was 80.

With respect to the obtained capacitor samples, the following measures were performed by each method shown below: rate of the segregation phases; Si.Y copresence ratio in the segregation phases; the number of the dielectric particles; the number of the dielectric particles dissolved 15% or more in solid; highly accelerated lifetime; dielectric loss, insulation resistance; and specific permittivity ε.

<Determination Method for Presence of Segregation of Y>

The obtained capacitor samples were cut at a section vertical to the dielectric layers. STEM-EDS mapping analysis was performed against areas of the section where the presence of the segregation of Y would be determined. The result of the mapping analysis of 7.0 μm×7.4 μm square was divided into dots of 0.027 μm/pixel and the contrast data of each pixel was converted into values. Specifically, the contrast data was classified into 90 levels by considering that the smallest contrast intensity (no detection) was 0 and that the strongest one was 90. It was considered that dots whose contrast intensity of Y was less than 75 were a condition that Y was not segregated, and that dots whose contrast intensity of Y was 75 or more were a condition that Y was segregated.

<Calculation Method for Rate of Segregation Phases of Y>

It was considered that the rate of dots whose contrast intensity of Y was 75 or more of the whole dots determined by the above "DETERMINATION METHOD FOR PRESENCE OF SEGREGATION OF Y" was a rate of the segregation phases of Y in an area where presence of the segregation of Y was to be determined.

<Measuring Method for Rate (a) of Segregation Phases in Neighboring Areas of Internal Electrodes of Dielectric Layers>

First, the dielectric layers were divided into six in the thickness direction. Then, the presence of the segregation in each area divided into six was determined based on the above "CALCULATION METHOD FOR RATE OF SEGREGATION PHASES OF Y". This determination was performed in five columns in total. That is, the presence of the segregation was determined at 30 places of 6×5 in total. In each area divided into six in the thickness direction, it was considered that two areas (10 places) adjacent to the internal electrodes were neighboring areas of the internal electrodes in the dielectric layers, and that two areas (10 places) of the nearly central of the dielectric layers were central areas of the dielectric layers. The rate of the segregation phases of Y was calculated in the 10 places of neighboring areas of the internal electrodes, and the rate (%) of the above (a) was measured on average.

<Measuring Method for Rate (b) of Segregation Phases in Central Area of Dielectric Layers>

With respect to the 10 places of the central area mentioned above, the rate of the segregation phases of Y was calculated as with the 10 places of the neighboring areas of the internal electrodes, and the rate (%) of the above (b) was measured on average.

<Measuring Method for Si.Y Copresence Ratio in Segregation Phases>

"Determination of the presence of the segregation of Si" was performed in the same manner of the above "determination of the presence of the segregation of Y". Then, Si/Y copresence ratio was obtained by the following:

(the number of dots in which both Si and Y were segregated)×100/(the number of dots in which one or more of fSi and Y was/were segregated).

<Number of Dielectric Particles in which R is Dissolved in Solid>

STEM-EDS mapping analysis was performed against areas where the number of the dielectric particles in which R was dissolved in solid and the number of the dielectric particles dissolved 15% or more are measured. The number of the dielectric particles in which R was dissolved in solid was counted visually in the visual field, where 30 or more of the dielectric particles in which R was dissolved in solid were within.

<Number of Dielectric Particles in which R is Dissolved 15% or More>

Mapping images of Y were obtained by performing quantitative analysis of characteristic X-ray of Y in the above visual field. The obtained mapping images were processed and the area (shell) where Y was dispersed in the dielectric particles was specified visually. The particle diameter of the dielectric particles was obtained, and the number of the dielectric particles was counted visually by regarding the dielectric particles whose thickness of the area where Y was dispersed was 15% or more of the particle diameter as dielectric particles dissolved 15% or more in solid.

<Presence of Segregation Phases to Discontinuous Parts of Internal Electrode Layers>

The capacitor samples were cut at faces vertical to the dielectric layers 2 and the internal electrode layers 3. Secondary electronic images and reflected electronic images of a scanning electron microscope (SEM) were photographed at the cut surfaces. The presence of the segregation phases 5 to the discontinuous parts 3a of the internal electrode layers 3 was able to be confirmed by the difference of the contrast by comparing with electrodes or dielectrics.

<Highly Accelerated Lifetime (Halt)>

Highly accelerated lifetime was evaluated by holding the capacitor samples in a DC voltage applied state under an electric field of 12.7 V/μm and measuring the lifetime at 180° C. In the present examples, the lifetime was defined as time to drop one digit of insulation resistance compared with the start of the application of voltage. Also, in the present examples, the above evaluation was performed against 20 capacitor samples, and the mean value was considered as the highly accelerated lifetime. 20 hours or more were considered as good for the evaluation criteria.

<Dielectric Loss (Tan δ)>

The dielectric loss (tan δ) was measured against the capacitor samples under the condition of 1 kHz frequency and 0.5 Vrms input signal level (measuring voltage) by a digital LCR meter (4274A made by YHP Ltd.) at the standard temperature of 25° C. The dielectric loss was preferably lower and 4.0% or less was considered as good in the present examples.

<IR (Insulation Resistance)>

The insulation resistance IR was measured against the capacitor samples after applying DC voltage of 16 V/μm to the capacitor samples at 20° C. for 1 minute by using an insulation resistance meter (R8340A made by Advantest Ltd.). In the present samples, it was preferably $7.0 \times 10^7$ (Ω) or, more preferably, $1.0 \times 10^8$ (Ω) or more.

<Specific Permittivity ∈>

The specific permittivity ∈ (no unit) was calculated against the capacitor samples from a capacitance measured under the condition of 1 kHz frequency and 1.0 Vrms input signal level (measuring voltage) by a digital LCR meter (4274A made by YHP Ltd.) at the standard temperature of 25° C. The specific permittivity is preferably higher and 300 or higher thereof was good in the present examples.

TABLE 1

| Sample number | Rate of segregation phases in neighboring areas of internal electrodes of dielectric layers (%) (a) | Rate of segregation phases in central areas of dielectric layers (%) (b) | a/b | Si•Y copresence ratio in segregation phases (%) | Number of dielectric particles (c) | Number of dielectric particles dissolved 15% or more in solid (d) | d/c | Highly accelerated lifetime (h) | Dielectric loss (%) | Insulation resistance (Ω) | Specific permittivity ε |
|---|---|---|---|---|---|---|---|---|---|---|---|
| 1* | 3.0 | 5.1 | 0.6 | 22.1 | 35 | 8 | 0.23 | 3.25 | 3.1 | 7.66E+07 | 3068 |
| 2* | 6.2 | 4.7 | 1.3 | 27.6 | 34 | 22 | 0.65 | 12.62 | 3.2 | 8.96E+07 | 3134 |
| 3 | 7.2 | 3.2 | 2.3 | 35.6 | 38 | 28 | 0.74 | 24.67 | 3.3 | 1.00E+08 | 3117 |
| 4 | 12.2 | 4.9 | 2.5 | 36.4 | 42 | 33 | 0.79 | 27.12 | 3.4 | 1.05E+08 | 3047 |
| 5 | 14.3 | 5.0 | 2.9 | 38.9 | 40 | 36 | 0.90 | 29.66 | 3.3 | 1.08E+08 | 3049 |
| 6 | 12.5 | 4.1 | 3.0 | 39.4 | 32 | 29 | 0.91 | 37.00 | 3.3 | 1.11E+08 | 3110 |

From the table 1, when a ratio of the segregation phases in the neighboring areas of the internal electrodes 2a of the dielectric layers was "a" and a ratio of the segregation phases in the central area 2b was "b", the examples (sample numbers 3 to 6) in which a/b was 2.0 or more were particularly good in highly accelerated lifetime and insulation resistance compared with the case of the comparative examples (sample numbers 1 and 2) in which a/b was less than 2.0.

TABLE 2

| Sample number | Rate of segregation phases in neighboring areas of internal electrodes of dielectric layers (%) (a) | Rate of segregation phases in central areas of dielectric layers (%) (b) | a/b | Si•Y copresence ratio in segregation phases (%) | Number of dielectric particles (c) | Number of dielectric particles dissolved 15% or more in solid (d) | d/c | Highly accelerated lifetime (h) | Dielectric loss (%) | Insulation resistance (Ω) | Specific permittivity ε |
|---|---|---|---|---|---|---|---|---|---|---|---|
| 11 | 14.7 | 4.1 | 3.6 | 36.4 | 41 | 17 | 0.41 | 28.54 | 4.4 | 9.20E+07 | 3074 |
| 12 | 15.2 | 4.0 | 3.8 | 37.6 | 36 | 25 | 0.69 | 30.33 | 4.2 | 9.96E+07 | 3106 |
| 4 | 12.2 | 4.9 | 2.5 | 36.4 | 42 | 33 | 0.79 | 27.12 | 3.4 | 1.05E+08 | 3047 |
| 5 | 14.3 | 5.0 | 2.9 | 38.9 | 40 | 36 | 0.90 | 29.66 | 3.3 | 1.08E+08 | 3049 |
| 6 | 12.5 | 4.1 | 3.0 | 39.4 | 32 | 29 | 0.91 | 37.00 | 3.3 | 1.11E+08 | 3110 |

The table 2 shows a result in which the ratio (d/c) of the dielectric particles dissolved 15% or more in solid out of the whole dielectric particles was varied while a/b was maintained 2.0 or more. In this case, in addition to the fact that all of highly accelerated lifetime, dielectric loss, insulation resistance and specific permittivity ∈ were in the preferable range, especially, the sample numbers 4 to 6 in which d/c was 0.70 or more (70% or more) had a preferable dielectric loss and insulation resistance compared with the sample numbers 11 and 12.

Experimental Example 2

An experiment was conducted under the same condition as EXPERIMENTAL EXAMPLE 1 except that the addition amount of Y was varied in the range of 0.03 to 1.5 mol in terms of $Y_2O_3$, and the fact that the same result as EXPERIMENTAL EXAMPLE 1 was obtained was confirmed.

Experimental Example 3

An experiment was conducted under the same condition as EXPERIMENTAL EXAMPLE 1 except that the addition amount of $(Ba_{0.6}Ca_{0.4})SiO_3$ was varied in the range of 0.01 to 0.10 mol in terms of Si, and the fact that the same result as EXPERIMENTAL EXAMPLE 1 was obtained was confirmed.

Experimental Example 4

An experiment was conducted under the same condition as EXPERIMENTAL EXAMPLE 1 except that (Ba, Ca)$SiO_3$ other than $(Ba_{0.6}Ca_{0.4})SiO_3$, $MSiO_3$ (M is an alkaline metal or an alkaline-earth metal other than Ba and Ca) or $SiO_2$ was used instead of using $(Ba_{0.6}Ca_{0.4})SiO_3$, and the fact that the same result as EXPERIMENTAL EXAMPLE 1 was obtained was confirmed.

Experimental Example 5

An experiment was conducted under the same condition as EXPERIMENTAL EXAMPLE 1 except that a rare-earth element other than Y was used as a rare-earth element R, and the fact that the same result as EXPERIMENTAL EXAMPLE 1 was obtained was confirmed.

NUMERICAL REFERENCES

1 . . . multilayer ceramic capacitor
2 . . . dielectric layer
2a . . . neighboring area
2b . . . central area
2c . . . connecting area
3 . . . internal electrode layer
3a . . . discontinuous part
4 . . . exterior electrode
5 . . . segregation phase
6 . . . dielectric particle
6a . . . core-shell particle
6b . . . all-solid-solution particle
60 . . . shell
62 . . . core
10 . . . capacitor element body

The invention claimed is:

1. A multilayer ceramic electronic device comprising a lamination in which an internal electrode layer and a dielectric layer are laminated alternatively, wherein
the dielectric layer is comprised of a dielectric ceramic composition including a main component represented by a general formula of $ABO_3$ (A is at least one selected from Ba, Sr and Ca, and B is at least one selected from Ti, Zr and Hf) and a rare-earth component R (R is at least one selected from Sc, Y, La, Ce, Pr, Nd, Pm, Sm, Eu, Gd, Tb, Dy, Ho, Er, Tm, Yb and Lu),
R segregation phases including the rare-earth component R are present in the dielectric layer, and
when the dielectric layer is separated to six areas by dividing the dielectric layer sandwiched by a pair of the internal dielectric layers in the thickness direction, there are the R segregation phases present in two neighboring areas respectively adjacent to the pair of the internal electrode layers in the dielectric layer at a ratio of double or more compared with the R segregation phases present in two central areas located at a substantially center in the dielectric layer.

2. The multilayer ceramic electronic device as set forth in claim 1, wherein
the dielectric layer additionally comprises a sub-component including Si,
at least a part of a Si segregation phase including Si is coexistently present at the R segregation phases in the dielectric layer, and
a Si.R copresence ratio showing a ratio of an area of a copresence region where the R segregation phases and the Si segregation phase are copresent is 35% or more with respect to an area of a region where the R segregation phases and/or the Si segregation phase are present.

3. The multilayer ceramic electronic device as set forth in claim 1, wherein
a dielectric particle in which the rare-earth component R is at least dissolved in solid on a surface of the main component of $ABO_3$ is present in the dielectric layer.

4. The multilayer ceramic electronic device as set forth in claim 1, wherein
the dielectric particle in which the rare-earth component R is dissolved in solid from a particle surface of the main component of $ABO_3$ in a range of 15% or more along a grain diameter is present in the dielectric layer and
a ratio of the dielectric particle dissolved in solid in the range of 15% or more is 70% or more with respect to the whole number of the dielectric particles in a predetermined observation visual field.

5. The multilayer ceramic electronic device as set forth in claim 1, wherein
there is a discontinuous part in the internal dielectric layer and the R segregation phases including the rare-earth component R are present at the discontinuous part.

* * * * *